United States Patent
Cho et al.

(10) Patent No.: US 8,337,069 B2
(45) Date of Patent: Dec. 25, 2012

(54) LIGHTBAR DEVICE AND DISPLAY MODULE THEREOF

(75) Inventors: Chin-Hsing Cho, Yunlin County (TW); Tsao-Yuan Fu, Taoyuan County (TW)

(73) Assignee: Chunghwa Picture Tubes, Ltd., Heping Rd., Bade, Taoyuan (TW)

( * ) Notice: Subject to any disclaimer, the term of this patent is extended or adjusted under 35 U.S.C. 154(b) by 106 days.

(21) Appl. No.: 12/983,888

(22) Filed: Jan. 4, 2011

(65) Prior Publication Data

US 2012/0092893 A1    Apr. 19, 2012

(30) Foreign Application Priority Data

Oct. 19, 2010   (TW) .............................. 99220171 U

(51) Int. Cl.
*F21V 7/00*   (2006.01)
*F21V 7/04*   (2006.01)

(52) U.S. Cl. .................... 362/633; 362/632; 362/634

(58) Field of Classification Search ........... 362/632–634
See application file for complete search history.

(56) References Cited

U.S. PATENT DOCUMENTS

| | | | |
|---|---|---|---|
| 7,441,938 B2 * | 10/2008 | Sakai et al. | 362/634 |
| 7,578,610 B2 * | 8/2009 | Sakamoto et al. | 362/634 |
| 7,604,389 B2 * | 10/2009 | Sakai et al. | 362/612 |
| 7,611,274 B2 * | 11/2009 | Hsiao et al. | 362/634 |
| 7,798,701 B2 * | 9/2010 | Mori et al. | 362/634 |
| 7,959,324 B2 * | 6/2011 | Hsu | 362/247 |
| 8,267,569 B2 * | 9/2012 | Hamada | 362/633 |
| 2008/0049444 A1 | 2/2008 | Hsiao et al. | |
| 2008/0232134 A1 * | 9/2008 | Weng et al. | 362/612 |

FOREIGN PATENT DOCUMENTS

TW    M366096    10/2009

\* cited by examiner

*Primary Examiner* — David J Makiya
(74) *Attorney, Agent, or Firm* — Winston Hsu; Scott Margo

(57) ABSTRACT

A lightbar device includes a plastic frame, a back plate, a lightbar, and at least one fixing pad. At least one positioning hole is formed on the back plate. The lightbar is slidably disposed between the back plate and the plastic frame. The fixing pad includes a base, a side board, and a first clamping portion. A recession is formed at the base. The recession is used for engaging with the positioning hole so as to fix the fixing pad onto the back plate. The side board is formed at a side of the base. The first clamping portion is formed at a position of the base opposite to the side board. The first clamping portion is used for clamping a first side of the lightbar cooperatively with the side board.

16 Claims, 10 Drawing Sheets

LIGHTBAR DEVICE AND DISPLAY MODULE THEREOF

BACKGROUND OF THE INVENTION

1. Field of the Invention

The present invention relates to a lightbar device and a display module thereof, and more specifically, to a lightbar device and a display module thereof utilizing a fixing pad disposed on a back plate to clamp a lightbar for fixing the lightbar onto the back plate detachably.

2. Description of the Prior Art

In general, in assembly design of a side-edge type backlight module, a common method for fixing a lightbar is to utilize twin adhesive tapes to stick the lightbar to a side of a back plate and then engage the back plate with a plastic frame after disposing related backlight components in the back plate. Accordingly, assembly of the backlight module is completed.

However, in the said method, if damage of light emitting units or other maintenance problems occur on the lightbar, disassembly of the related backlight components needs to be performed first so that the lightbar can be detached from the backlight module subsequently. Furthermore, this method makes it hard to detach the lightbar smoothly due to the twin adhesive tapes, so as to cause a time-consuming assembly process as well as a difficult rework process. In addition, the lightbar based on this method has a poor thermal conductivity efficiency.

SUMMARY OF THE INVENTION

The present invention provides a lightbar device comprising a plastic frame, a back plate, a lightbar, and at least one fixing pad. The back plate has at least one positioning hole. The lightbar is slidably disposed between the back plate and the plastic frame. The fixing pad comprises a base, a side board, and a first clamping portion. The base has a recession. The recession is used for engaging with the positioning hole so as to fix the fixing pad onto the back plate. The side board is formed at a side of the base. The first clamping portion is formed at a position of the base opposite to the side board, for clamping a first side of the lightbar cooperatively with the side board.

The present invention further provides a display module comprising a lightbar device, a panel device, and an outer frame. The lightbar device comprises a plastic frame, a back plate, a lightbar, and at least one fixing pad. The back plate has at least one positioning hole. The lightbar is slidably disposed between the back plate and the plastic frame. The fixing pad comprises a base, a side board, and a first clamping portion. The base has a recession. The recession is used for engaging with the positioning hole so as to fix the fixing pad onto the back plate. The side board is formed at a side of the base. The first clamping portion is formed at a position of the base opposite to the side board, for clamping a first side of the lightbar cooperatively with the side board. The panel device is disposed on the lightbar device. The outer frame is disposed on the panel device for fixing the panel device onto the lightbar device.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the description and following claims to refer to particular components. As one skilled in the art will appreciate, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ".

Figure 1:
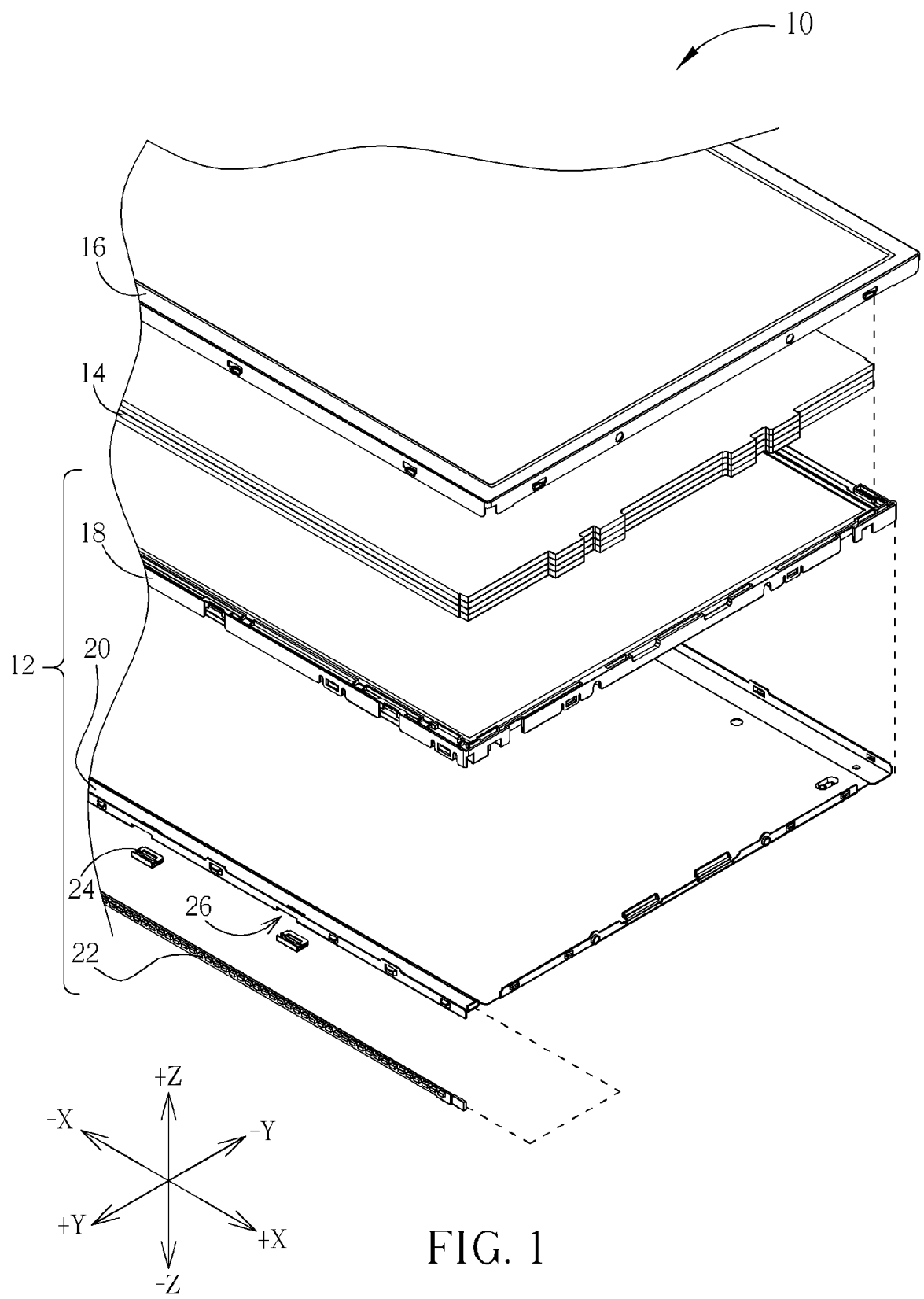
FIG. 1 is a partial exploded diagram of a display module according to a preferred embodiment of the present invention.

Please refer to FIG. 1, which is a partial exploded diagram of a display module 10 according to a preferred embodiment of the present invention. The display module 10 includes a lightbar device 12, a panel device 14, and an outer frame 16. The panel device 14 is disposed on the lightbar device 12. In this embodiment, the panel device 14 includes components commonly used in a display panel, such as a lens film, a diffusing film, and a light guide plate. The outer frame 16 is used for fixing the panel device 14 onto the lightbar device 12.

Figure 2:
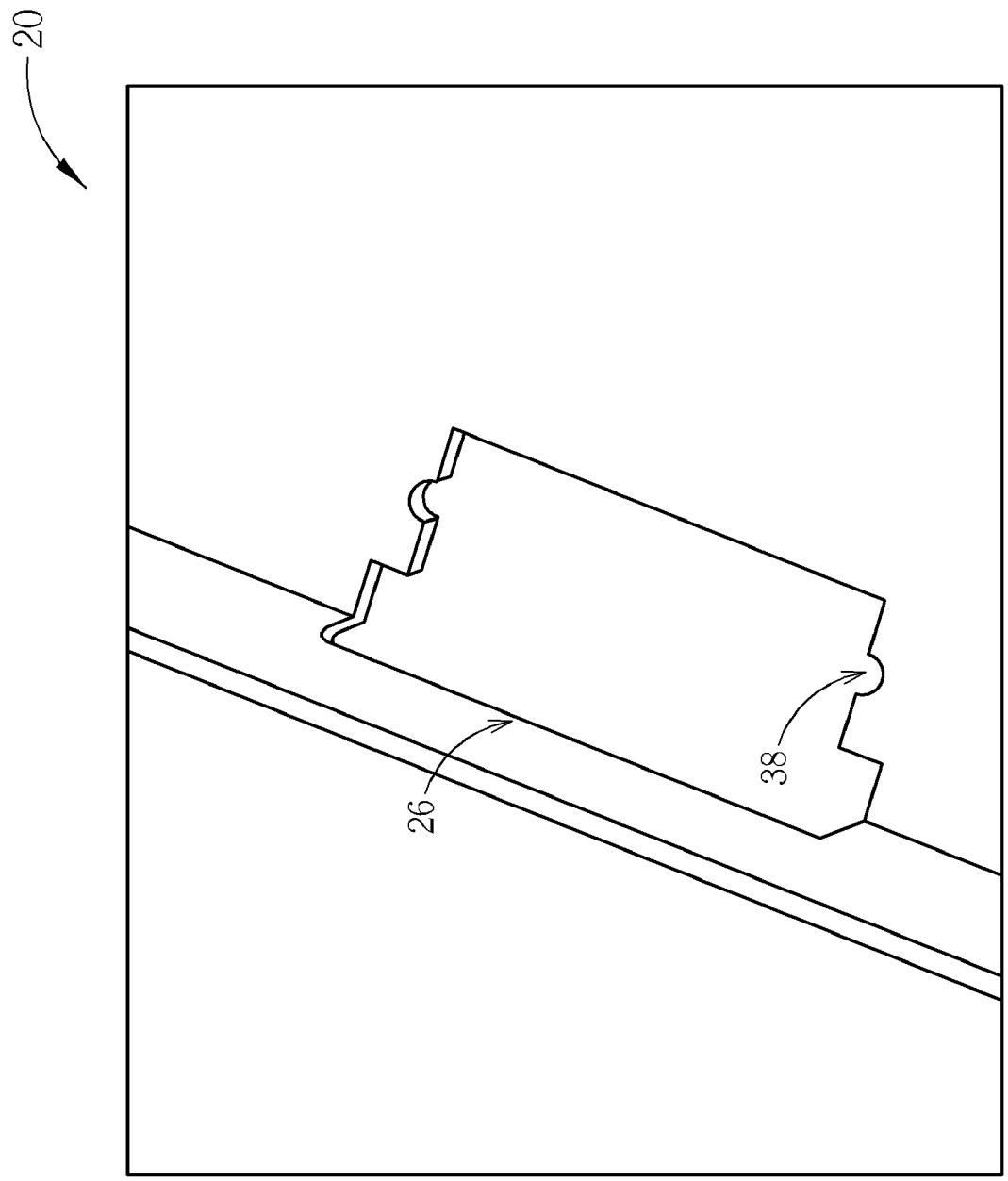
FIG. 2 is a partial enlarged diagram of a back plate in FIG. 1.
Figure 2:
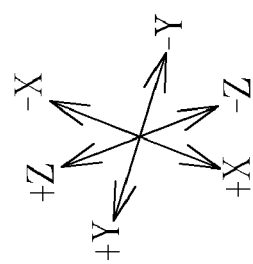
Figure 3:
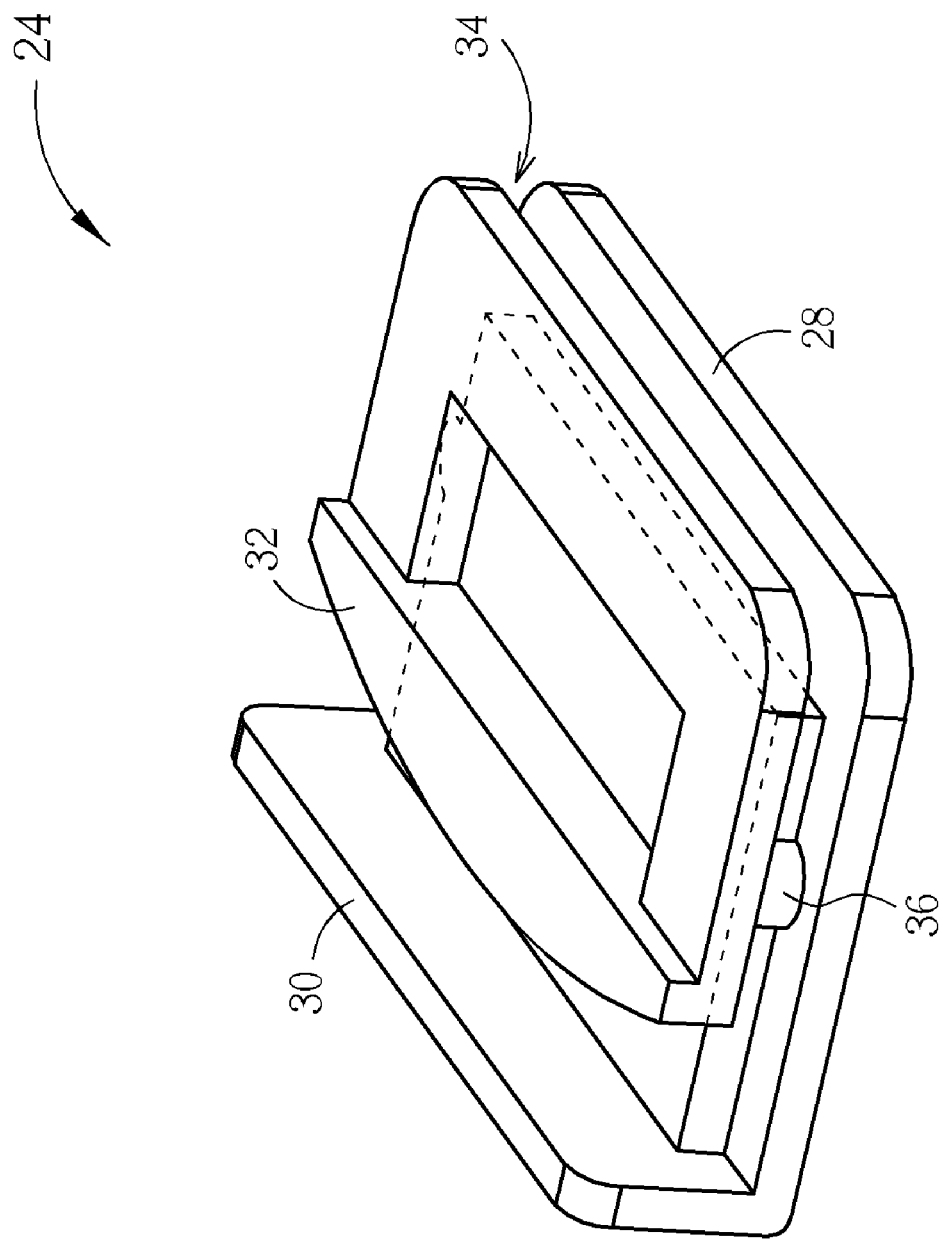
FIG. 3 is an enlarged diagram of a fixing pad in FIG. 1.
Figure 4:
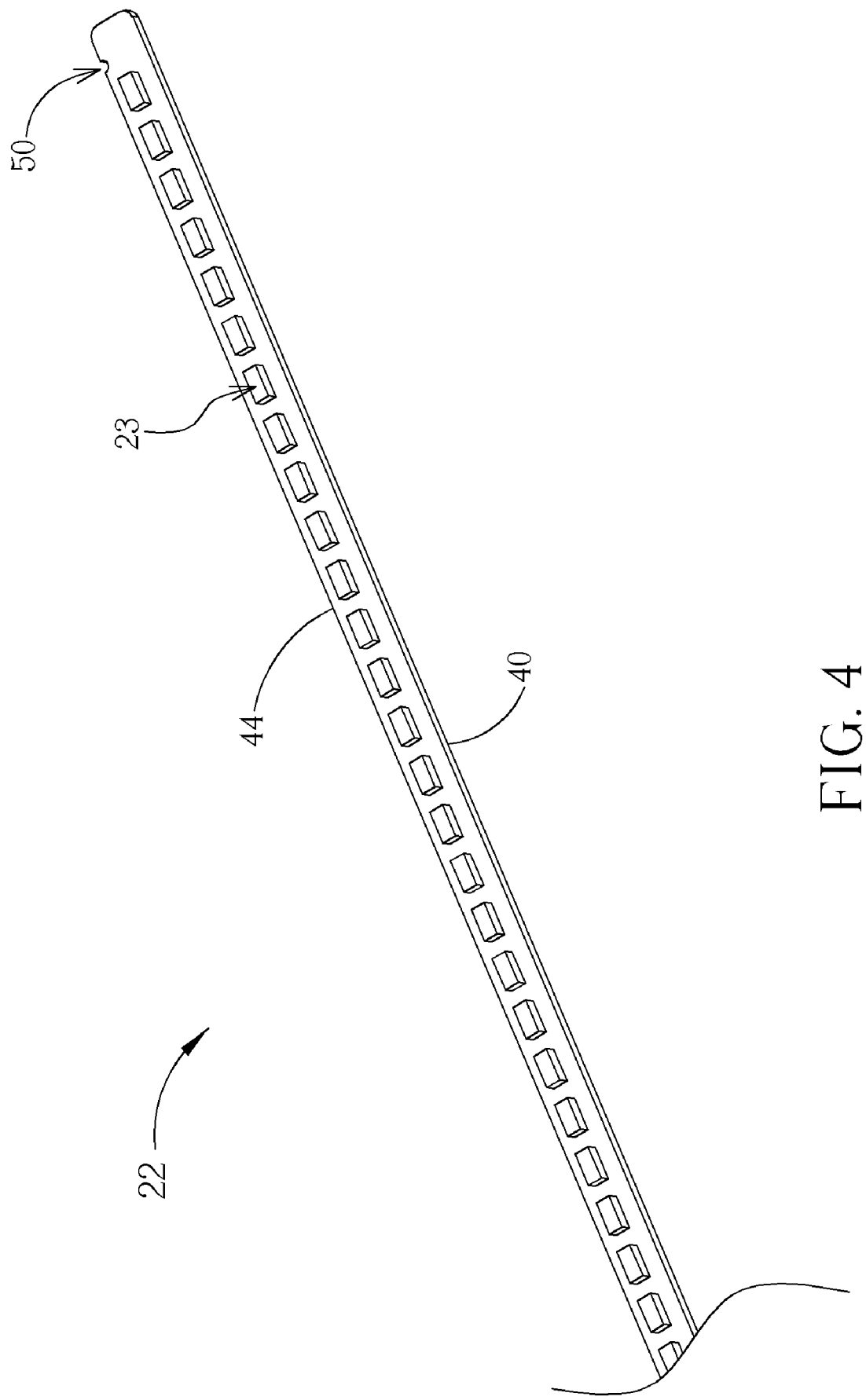
FIG. 4 is a partial enlarged diagram of a lightbar in FIG. 1.
Figure 5:
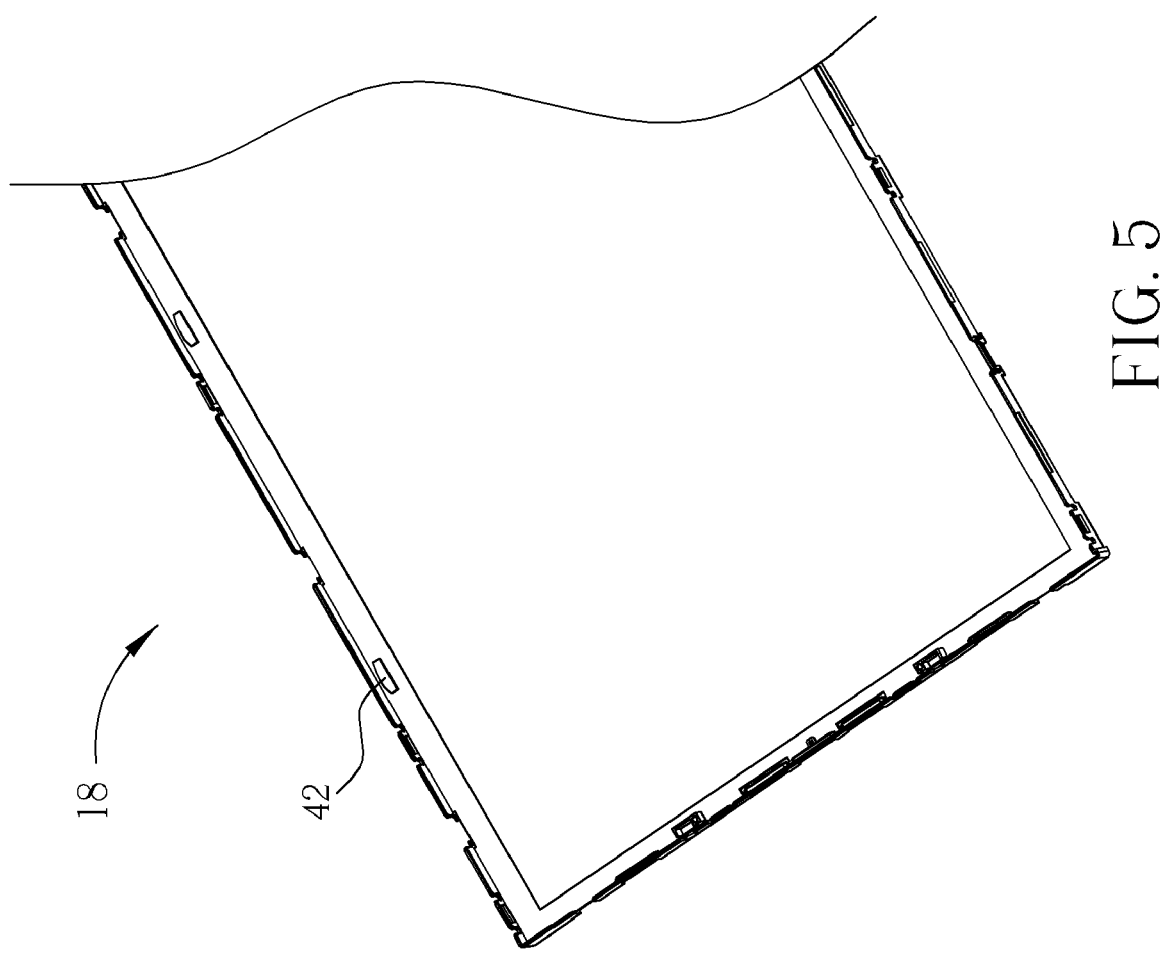
FIG. 5 is a partial enlarged diagram of a plastic frame in FIG. 1.

Furthermore, as shown in FIG. 1, the lightbar device 12 includes a plastic frame 18, a back plate 20, a lightbar 22, and at least one fixing pad 24 (two shown in FIG. 1, but not limited thereto). At least one positioning hole 26 (two shown in FIG. 1, but not limited thereto) is disposed on the back plate 20 corresponding to the fixing pad 24. The lightbar 22 is slidably disposed between the back plate 20 and the plastic frame 18. More detailed description for the structural designs of the plastic frame 18, the back plate 20, the lightbar 22, and the fixing pad 24 is provided as follows. Please refer to FIG. 2, FIG. 3, FIG. 4, and FIG. 5. FIG. 2 is a partial enlarged diagram of the back plate 20 in FIG. 1. FIG. 3 is an enlarged diagram of the fixing pad 24 in FIG. 1. FIG. 4 is a partial enlarged diagram of the lightbar 22 in FIG. 1. FIG. 5 is a partial enlarged diagram of the plastic frame 18 in FIG. 1. As shown in FIG. 2 and FIG. 3, the fixing pad 24 includes a base 28, a sideboard 30, and a first clamping portion 32. The fixing pad 24 is preferably made of plastic, rubber, or metal material. A recession 34 is formed on the base 28. The recession 34 is used for engaging with the positioning hole 26 so as to fix the fixing pad 24 onto the back plate 20. Furthermore, at least one protruding portion 36 (two shown in FIG. 3) is formed in the recession 34, and at least one limiting opening 38 (two shown in FIG. 2) is formed at the positioning hole 26 corresponding to the protruding portions 36. The protruding portion 36 is used for engaging with the corresponding limiting opening 38 when the recession 34 is engaged with the positioning hole 26. The side board 30 is formed at a side of the base 28. The first clamping portion 32 is formed at a position of the base 28 opposite to the side board 30 (as shown in FIG. 3) for clamping a first side 40 of the lightbar 22 in FIG. 4 with the side board 30 when the lightbar 22 is disposed between the plastic frame 18 and the back plate 20. Accordingly, the lightbar 22 is fixed. Furthermore, as shown in FIG. 4, a plurality of light emitting units 23 is disposed on the lightbar 22 for providing light to the panel device 14. In this embodiment, each light emitting unit 23 is preferably a light emitting diode.

Furthermore, as shown in FIG. 5, in this embodiment, a second clamping portion 42 is formed on the plastic frame 18 corresponding to the first clamping portion 32 of the fixing pad 24. The second clamping portion 42 is used for clamping a second side 44 of the lightbar 22 in FIG. 4 with the back plate 20. In this embodiment, the first clamping portion 32 and the second clamping portion 42 are preferably an arc-shaped protruding structure for pushing the lightbar 22 to abut against the back plate 20 by its protruding contour.

Figure 6:
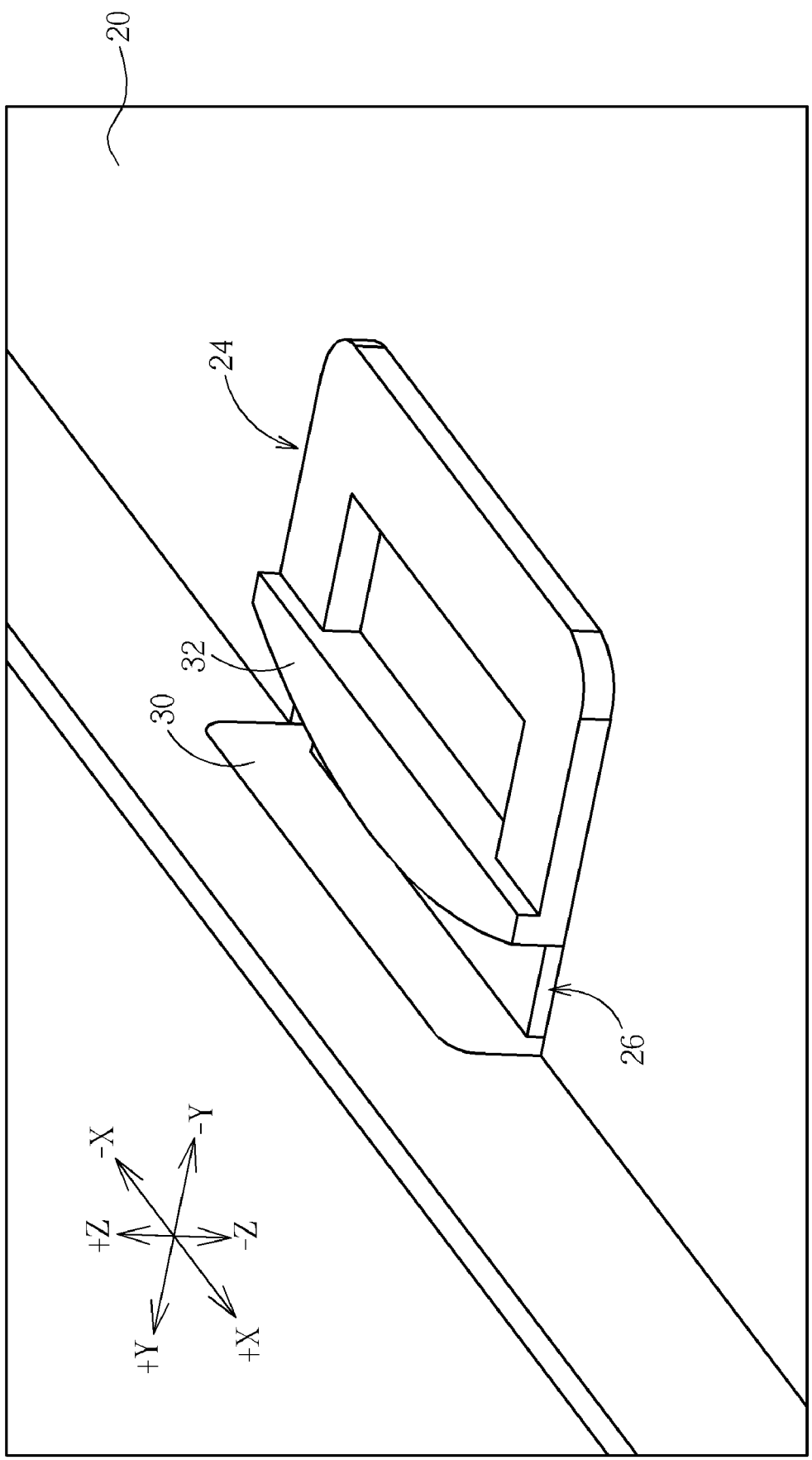
FIG. 6 is an assembly diagram of the fixing pad in FIG. 1 and the back plate.

In the following, related description for assembly of the display module 10 and disassembly of the lightbar 22 is provided in detail. For the assembly of the display module 10, please refer to FIG. 1, FIG. 2, FIG. 3, FIG. 4, and FIG. 6. FIG. 6 is an assembly diagram of the fixing pad 24 in FIG. 1 and the back plate 20. First, the fixing pad 24 in FIG. 3 is inserted into the positioning hole 26 along a −Y-axis direction as shown in FIG. 2 until the recession 34 of the fixing pad 24 is simultaneously engaged with the side edge and the bottom edge of the positioning hole 26 (as shown in FIG. 6). In such a manner, via engagement of the recession 34 with the side edge and the bottom edge of the positioning hole 26, motion of the fixing pad 24 toward ±X-axis directions, the −Y-axis direction, and ±Z-axis directions is constrained. Furthermore, when the recession is engaged with the bottom edge of the positioning 26, the protruding portion 36 in FIG. 3 is also engaged with the limiting opening 38 in FIG. 2 for further constraining motion of the fixing pad 24 toward a +Y-axis direction. To be summarized, in this embodiment, the fixing pad 24 can be fixed to the positioning hole 26 in three axes by engagement of the recession 34 with the side edge and the bottom edge of the positioning hole 26 and engagement of the protruding portion 36 with the corresponding limiting opening 38, so that disposal of the fixing pad 24 on the back plate 20 can be more firm.

After the fixing pad 24 is disposed on the back plate 20, backlight components (e.g. a light guide plate) in the panel device 14 are disposed on the back plate 20 in turn, and the plastic frame 18 is then disposed on the back plate 20 along the −Z-axis direction as shown in FIG. 1. Subsequently, after film components (e.g. a lens film, a diffusing film, etc.) in the panel device 14 are disposed on the plastic frame 18 in turn, the outer frame 16 is used for covering the panel device 14 along the −z-axis direction for fixing the panel device to the lightbar device 12.

Figure 7:
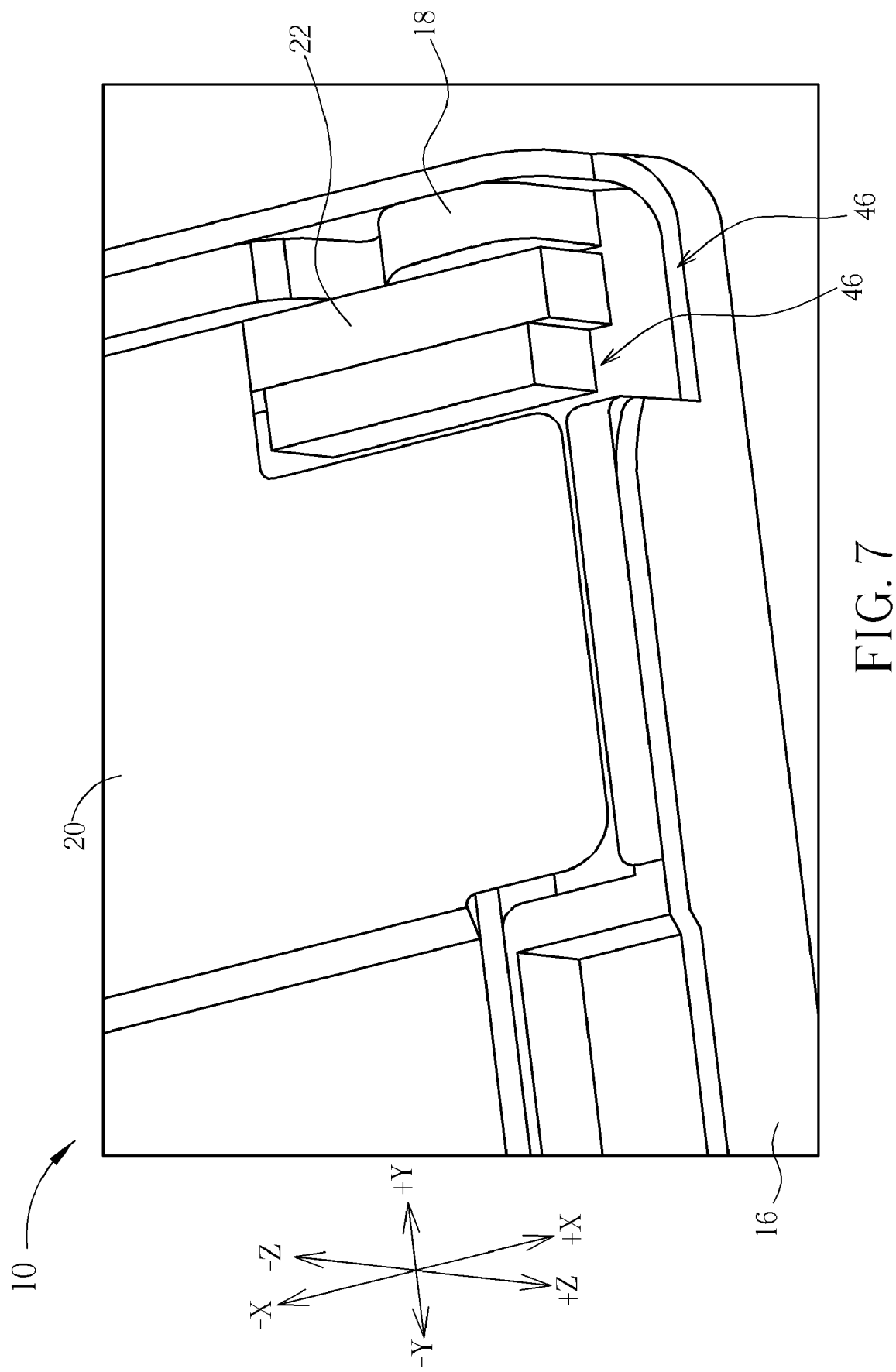
FIG. 7 is a partial assembly diagram of the display module in FIG. 1.
Figure 8:
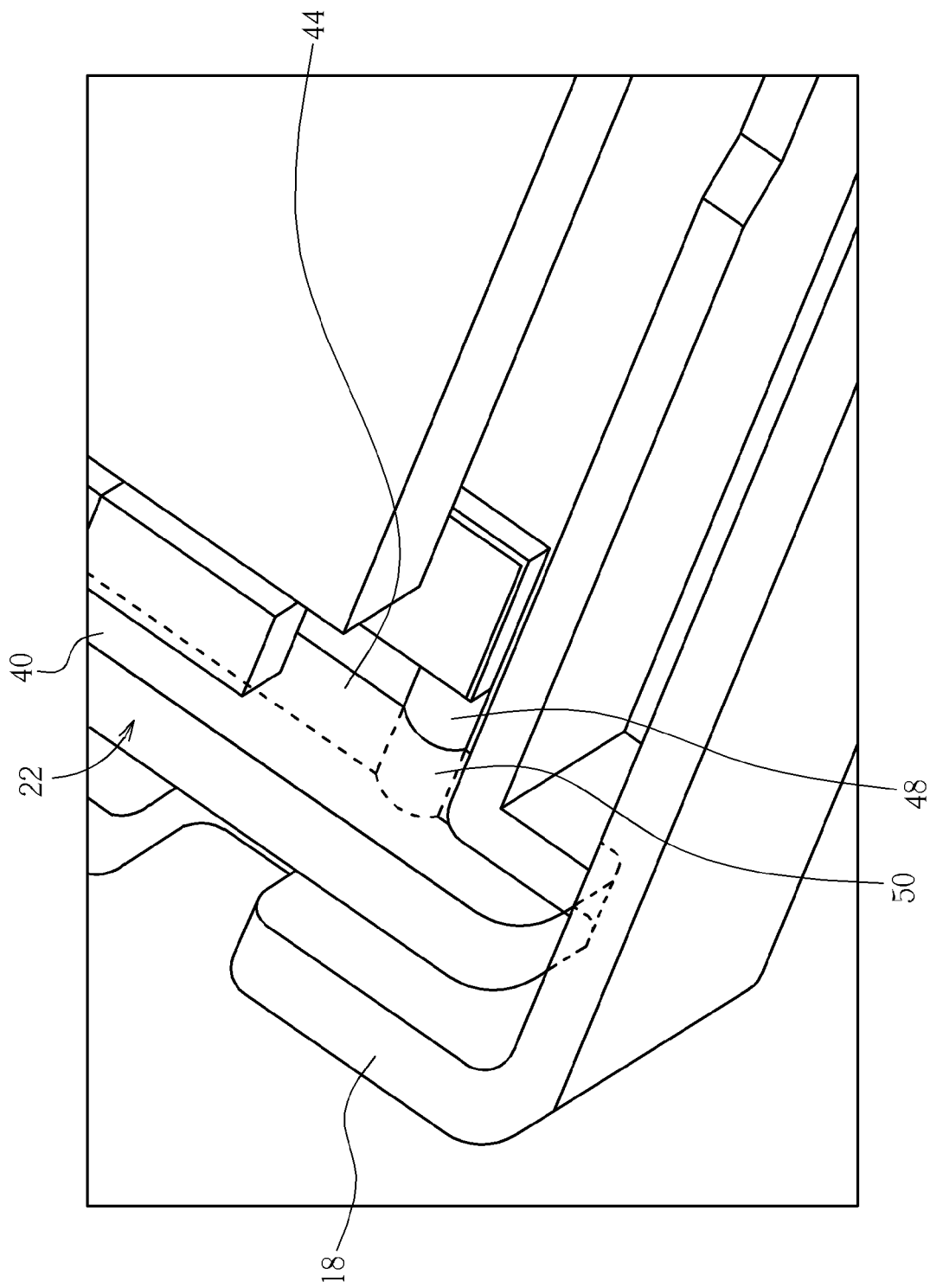
FIG. 8 is a partial assembly diagram of the plastic frame in FIG. 7 and the lightbar.

Finally, after disposing the lightbar 22 in FIG. 4 between the back plate 20 and the plastic frame 18, assembly of the display module 10 is completed accordingly. Furthermore, please refer to FIG. 7 and FIG. 8. FIG. 7 is a partial assembly diagram of the display module 10 in FIG. 1. FIG. 8 is a partial assembly diagram of the plastic frame 18 in FIG. 7 and the lightbar 22. As shown in FIG. 7, both the plastic frame 18 and the outer frame 16 have an extraction opening 46 for replacing the lightbar 22. As shown in FIG. 8, a positioning rib 48 is formed on the plastic frame 18, and a positioning hole 50 is correspondingly formed at a second side 44 of the lightbar 22. The positioning rib 48 is used for engaging with the positioning hole 50 so as to fix the lightbar 22 between the back plate 20 and the plastic frame 18.

Figure 9:
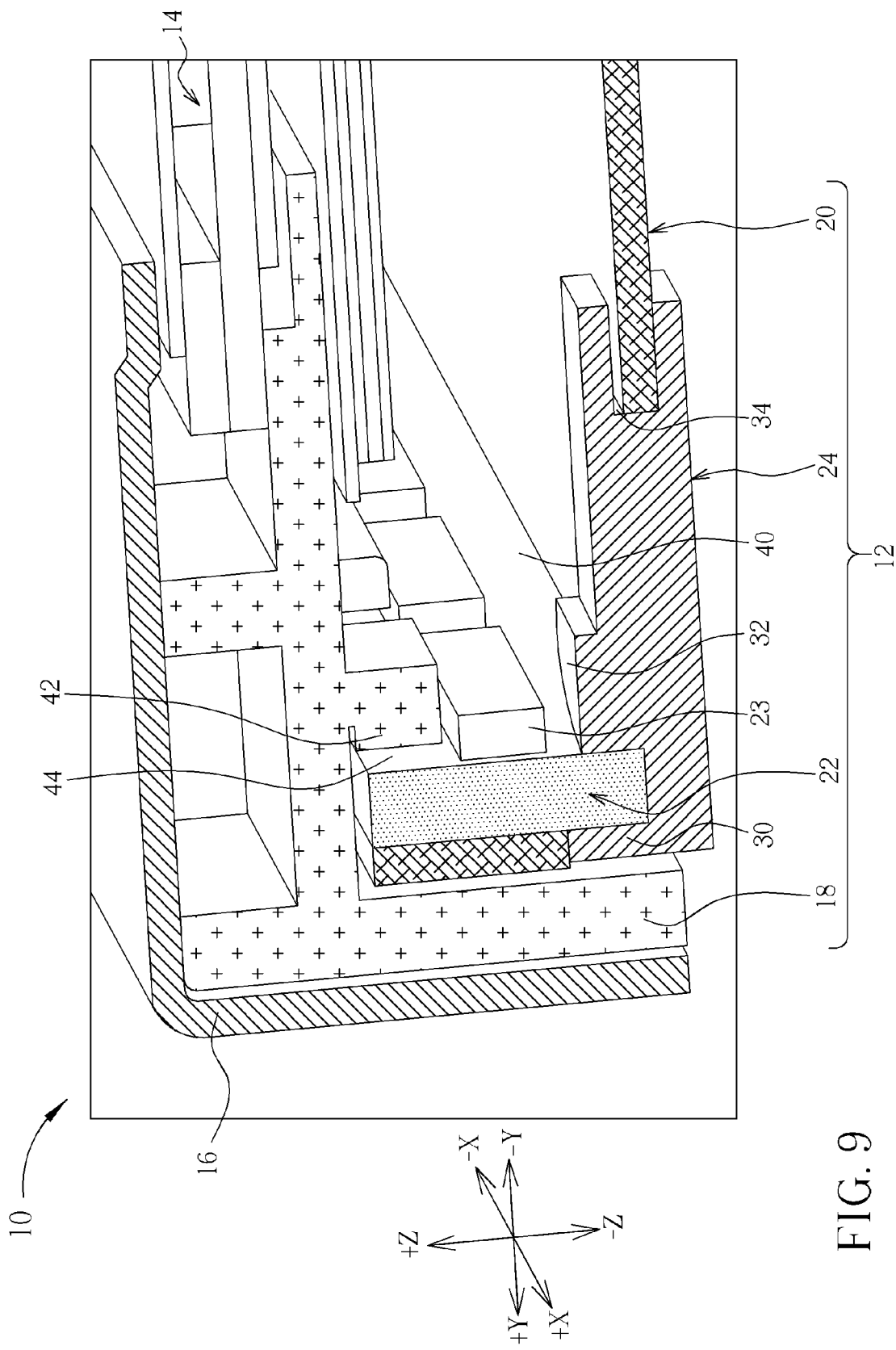
FIG. 9 is a partial sectional view of the display module in FIG. 1 after assembly.

In summary, in this embodiment, if a user wants to dispose the lightbar 22 between the plastic frame 18 and the back plate 20 with the panel device 14, the user just needs to push the lightbar 22 to pass through the extraction openings 46 of the outer frame 16 and the plastic frame 18 in turn along the −X-axis direction as shown in FIG. 7, until the positioning opening 50 of the lightbar 22 is engaged with the positioning rib 48 of the plastic frame 18 (as shown in FIG. 8). During this process, as shown in FIG. 9, which is a partial sectional view of the display module 10 in FIG. 1 after assembly, the first side 40 of the lightbar 22 is clamped by the first clamping portion 32 and the side board 30 and the second side 44 of the lightbar 22 abuts against the second clamping portion 42, so as to abut the lightbar 22 against the back plate 20. In such a manner, the lightbar 22 can be disposed between the back plate 20 and the plastic frame 18 more firmly.

On the other hand, if damage of the light emitting unit 23 occurs on the lightbar 22, the user just needs to pull the lightbar 22 from the extraction openings 46 of the outer frame 16 and the plastic frame 18 in turn along the +X-axis direction as shown in FIG. 7, until the lightbar 22 is completely separate from the plastic frame 18 and the outer frame 16. In such a manner, disassembly of the lightbar 22 can be completed without additionally detaching other components from the display module 10.

It should be mentioned that engagement of the protruding portion 36 with the limiting opening 38, disposal of the second clamping portion 42, and engagement of the positioning rib 48 with the positioning opening 50 are an omissible design for simplifying the structural design of the lightbar device 12. For example, the present invention can only utilize tight engagement of the recession 34 with the positioning hole 26 to fix the fixing pad 24 to the back plate 20, and only utilize the first clamping portion 32 and the side board 30 of the fixing pad 24 to clamp the first side 40 of the lightbar 22. As for which design is utilized, it depends on practical applications of the display module 10. Furthermore, the structural designs of the first clamping portion 32 and the second clamping portion 42 are not limited to the arc-shaped protruding structure mentioned in the said embodiment, meaning that all structures capable of utilizing its protruding contour to push the lightbar 22 against the back plate 20 fall within the scope of the present invention.

Figure 10:
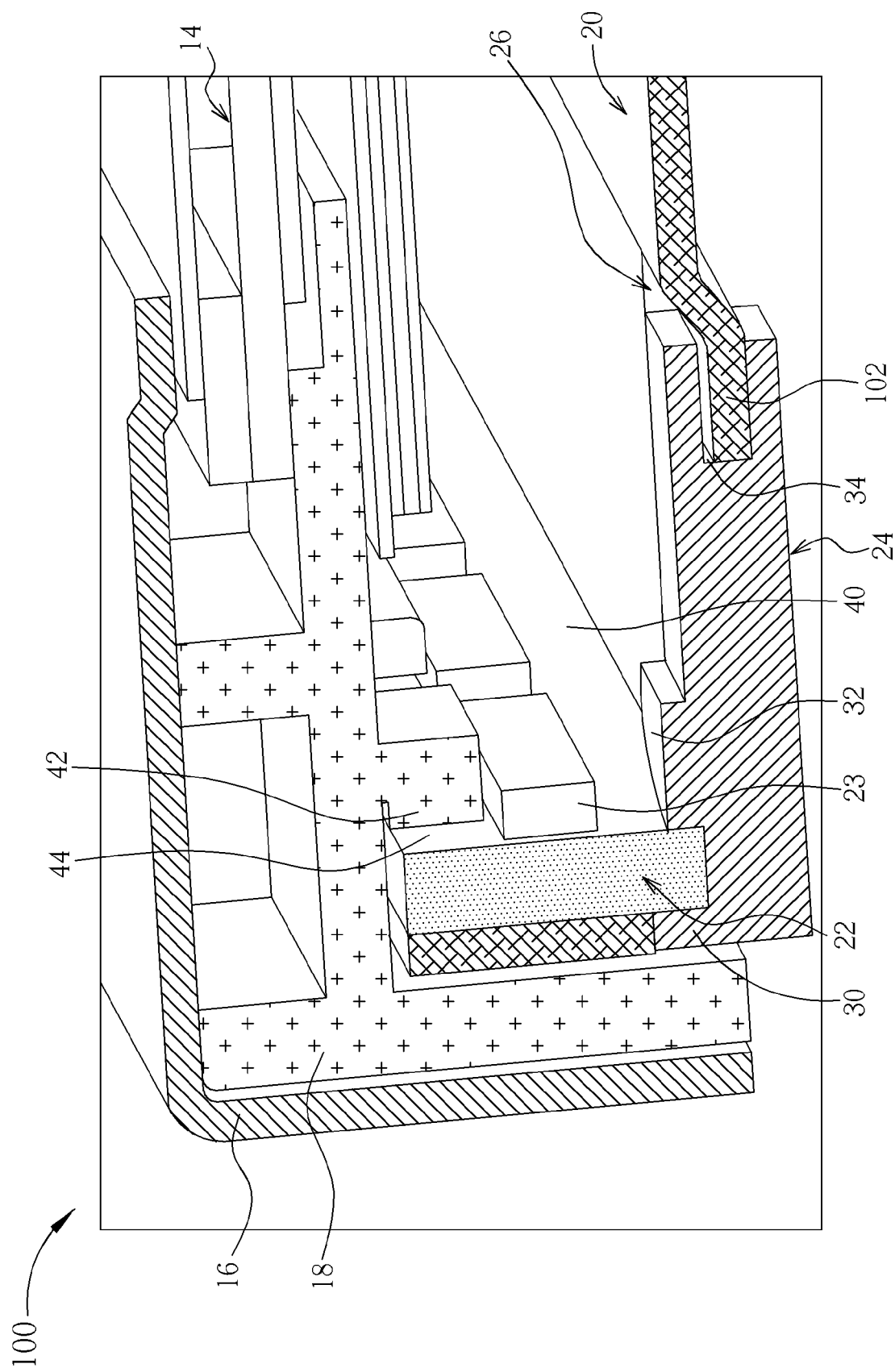
FIG. 10 is a partial sectional view of a display module according to another preferred embodiment of the present invention.

Please refer to FIG. 10, which is a partial sectional view of a display module 100 according to another preferred embodiment of the present invention. Components both mentioned in this embodiment and the said embodiment represent components with similar functions or structures. The major difference between the display module 100 and the display module 10 is the structural design of the positioning hole. As mentioned above, in the assembly process of the display module 10, if the backlight components (e.g. a light guide plate) in the panel device 14 are disposed on the back plate 20 in turn before the fixing pad 24 is disposed on the back plate 20, the recession 34 of the fixing pad 24 can not be engaged with the bottom of the positioning hole 26 due to being blocked by the said backlight components. Thus, in the said embodiment, the assembly step of fixing the fixing pad 24 to the positioning hole 26 needs to be performed in advance. In this embodiment, as shown in FIG. 10, a recessed portion 102 is extensively formed at the bottom of the positioning hole 26 for engaging with the recession 34. In such a manner, even if the backlight components in the panel device 14 are disposed on the back plate 20 first, a containing space provided by the recessed portion 102 can still allow the recession 34 to be engaged therewith, so as to prevent the said situation. Thus, flexibility of the display module 100 in assembly is further increased.

Compared with the prior art, in which twin adhesive tapes are utilized to fix a lightbar to a back plate, the present invention utilizes the design that the recession of the fixing pad is engaged with the positioning hole of the back plate and the lightbar is clamped by the clamping portion and the side board of the fixing pad, to achieve the purpose of the lightbar being detachably fixed to the back plate. In such a manner, since the lightbar can be fixed to the back plate without twin adhesive tapes and the disassembly of the lightbar can be performed without detaching the related backlight components first, the present invention can not only reduce time and manpower needed for the assembly and disassembly of the lightbar greatly, but also increase convenience of the lightbar in maintenance. Besides, the present invention can further solve the said heat-dissipating problem caused by the poor heat conductivity of the twin adhesive tape, so as to improve the heat-dissipating efficiency of the lightbar.

Those skilled in the art will readily observe that numerous modifications and alterations of the device and method may be made while retaining the teachings of the invention.

What is claimed is:

1. A lightbar device comprising:
    a plastic frame;
    a back plate having at least one positioning hole;
    a lightbar slidably disposed between the back plate and the plastic frame; and
    at least one fixing pad comprising:
        a base having a recession formed at a first side of the base, the recession being used for engaging with the positioning hole in a first direction so as to fix the fixing pad onto the back plate;
        a side board formed at a second side of the base; and
        a first clamping portion formed at a position of the base opposite to the side board, for clamping a first side of the lightbar cooperatively with the side board in a second direction different from the first direction.

2. The lightbar device of claim 1, wherein at least one protruding portion is formed in the recession, a limiting opening is formed at a position of the positioning hole corresponding to the protruding portion, and the protruding portion is used for engaging with the limiting opening when the recession is engaged with the positioning hole.

3. The lightbar device of claim 1, wherein a second clamping portion is formed at a position of the plastic frame corresponding to the first clamping portion, and the second clamping portion is used for clamping a second side of the lightbar cooperatively with the back plate.

4. The lightbar device of claim 3, wherein the first clamping portion and the second clamping portion are an arc-shaped protruding structure.

5. The lightbar device of claim 1, wherein a positioning rib is formed on the plastic frame, a positioning opening is correspondingly formed on the lightbar, and the positioning rib is used for engaging with the positioning opening so as to fix the lightbar between the back plate and the plastic frame.

6. The lightbar device of claim 1, wherein the plastic frame has an extraction opening for replacing the lightbar.

7. The lightbar device of claim 1, wherein a recessed portion is extensively formed at the positioning hole corresponding to a bottom of the recession.

8. The lightbar device of claim 1, wherein the fixing pad is made of plastic, rubber, or metal material.

9. A display module comprising:
    a lightbar device comprising:
        a plastic frame;
        a back plate having at least one positioning hole;
        a lightbar slidably disposed between the back plate and the plastic frame; and
        at least one fixing pad comprising:
            a base having a recession formed at a first side of the base, the recession being used for engaging with the positioning hole in a first direction so as to fix the fixing pad onto the back plate;
            a side board formed at a second side of the base; and
            a first clamping portion formed at a position of the base opposite to the side board, for clamping a first side of the lightbar cooperatively with the side board in a second direction different from the first direction;
    a panel device disposed on the lightbar device; and
    an outer frame disposed on the panel device for fixing the panel device onto the lightbar device.

10. The display module of claim 9, wherein at least one protruding portion is formed in the recession, a limiting opening is formed at a position of the positioning hole corresponding to the protruding portion, and the protruding portion is used for engaging with the limiting opening when the recession is engaged with the positioning hole.

11. The display module of claim 9, wherein a second clamping portion is formed at a position of the plastic frame corresponding to the first clamping portion, and the second clamping portion is used for clamping a second side of the lightbar cooperatively with the back plate.

12. The display module of claim 11, wherein the first clamping portion and the second clamping portion are an arc-shaped protruding structure.

13. The display module of claim 9, wherein a positioning rib is formed on the plastic frame, a positioning opening is correspondingly formed on the lightbar, and the positioning rib is used for engaging with the positioning opening so as to fix the lightbar between the back plate and the plastic frame.

14. The display module of claim 9, wherein the plastic frame has an extraction opening for replacing the lightbar.

15. The display module of claim 9, wherein a recessed portion is extensively formed at the positioning hole corresponding to a bottom of the recession.

16. The display module of claim 9, wherein the fixing pad is made of plastic, rubber, or metal material.

* * * * *